Sept. 10, 1929.  W. GRIFFIN  1,727,642
VESTIBULE FOR ARTICULATED CARS
Filed Jan. 20, 1928  3 Sheets-Sheet 1

INVENTOR
William Griffin
BY T. H. Gibbs
ATTORNEY

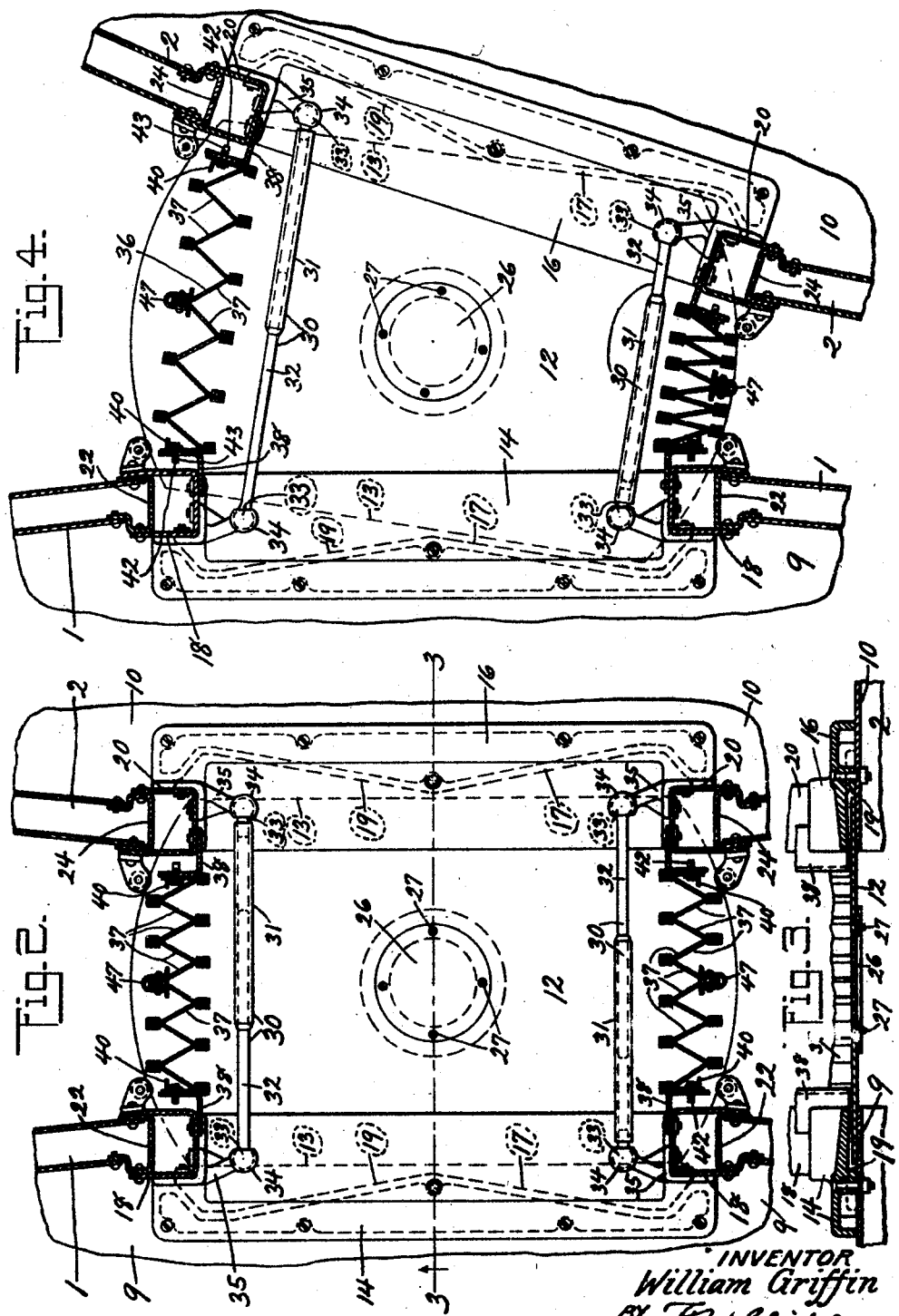

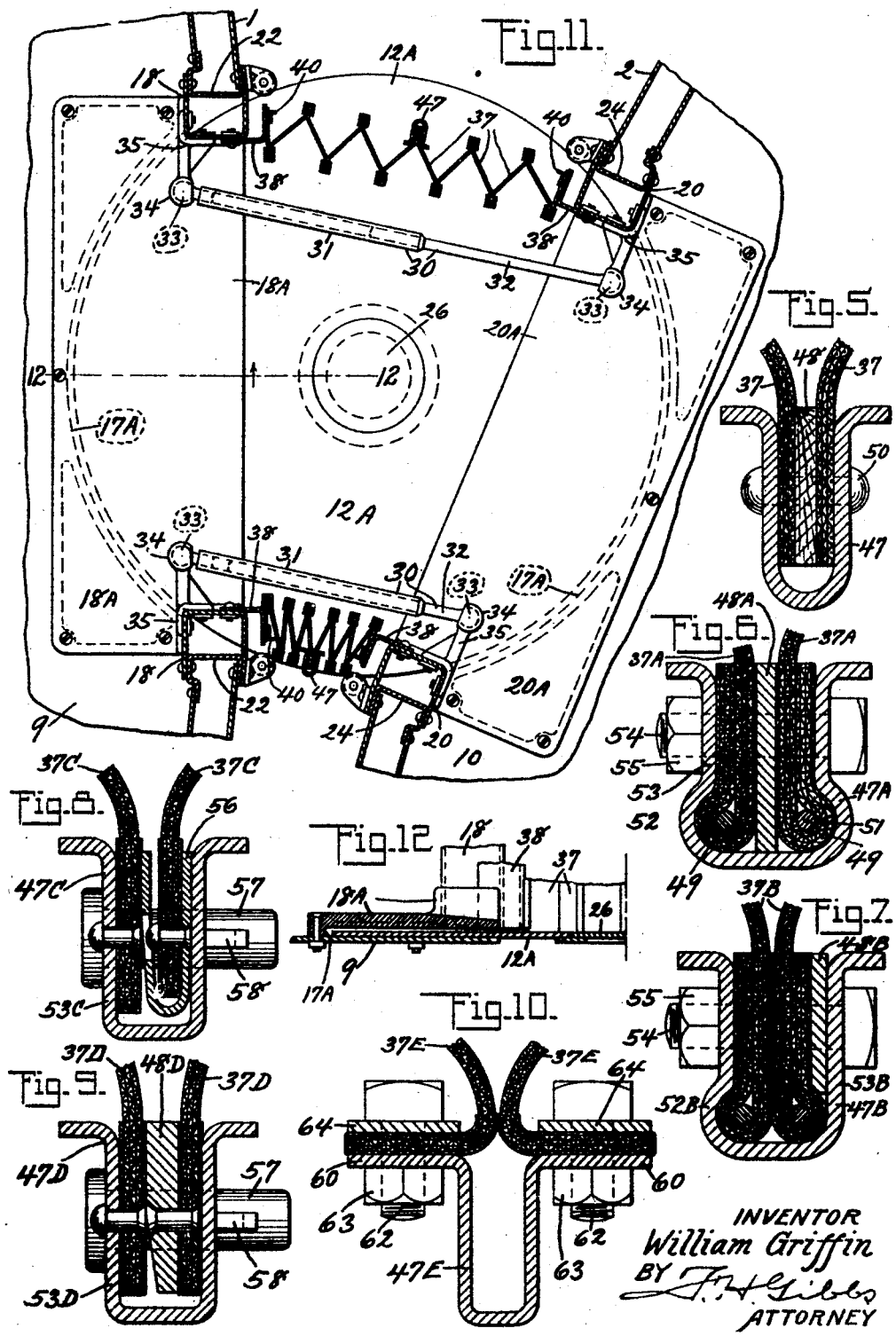

Patented Sept. 10, 1929.

1,727,642

UNITED STATES PATENT OFFICE.

WILLIAM GRIFFIN, OF PASSAIC, NEW JERSEY, ASSIGNOR TO AMERICAN CAR AND FOUNDRY COMPANY, OF NEW YORK, N. Y., A CORPORATION OF NEW JERSEY.

VESTIBULE FOR ARTICULATED CARS.

Application filed January 20, 1928. Serial No. 248,135.

Reference is had to the accompanying drawings which illustrate the preferred form of the invention; though it is to be understood that the invention is not limited to the exact details of construction shown and described, as it is obvious that various modifications thereof within the scope of the claims will occur to persons skilled in the art.

In the drawings:

Figure 1 is a view of a vestibule for articulated cars constructed in accordance with this invention, the portion to the right of the center being shown in elevation; the portion to the left being shown in vertical section and the supporting truck being shown in broken lines;

Fig. 2 is a horizontal section taken on the line 2—2 of Fig. 1 showing the positions of the diaphragms and vestibule floor plate with the car bodies alined;

Fig. 3 is a partial vertical section taken on the line 3—3 of Fig. 2;

Fig. 4 is a view similar to Fig. 2 showing the car bodies disposed at an angle to each other;

Fig. 5 is a horizontal section through the means for securing the vestibule diaphragm sections together;

Figs. 6, 7, 8, 9 and 10 are views similar to Fig. 5 showing modified securing means;

Fig. 11 is a view similar to Fig. 4 showing a modified vestibule floor plate; and Fig. 12 is a partial vertical section taken on the line 12—12 of Fig. 11.

It is an object of this invention to provide an improved vestibule connection between the bodies of an articulated car which will provide a safe passageway between the car bodies for passengers at all times, which will permit of the use of the cars on curves of small radii and which will permit of the ready separation of the car bodies.

As shown in the drawings, the invention is shown applied to an articulated car construction comprising a plurality of car bodies 1 and 2 having their adjacent ends supported upon a common truck 3 by means of body center bearings 4 and 5 secured to the respective car bodies and supported upon a truck center bearing 6 carried upon a bolster 7 of the truck 3 and secured thereto by a king bolt 8. This construction is described in the application of Allen E. Ostrander and Victor Willoughby, Serial No. 244,399, filed January 4, 1928, and does not form a part of this invention. While a particular means for securing the car bodies together and to the truck is shown, it is to be understood that this invention may be used with any suitable connecting means.

Mounted upon the floor plates 9 and 10 of the car bodies 1 and 2, respectively, is a vestibule floor plate 12 which spans the opening between the ends of the car floor plates and serves to form the floor of a passageway between the car ends. The edges of the floor plate 12 adjacent the car ends are overlapped by threshold plates 14 and 16 carried by the car floor plates, and by false posts 18 and 20 carried by the end posts 22 and 24 of the respective car ends. While the threshold plates and false posts overlap the edges of the vestibule floor plates, they do not bear upon the vestibule floor plates, and the vestibule floor plates are free to move with respect to the false posts and threshold plates. As shown in Figs. 2 and 4, the edges 13 of the vestibule floor plates 12 adjacent the car ends are straight and cooperate with the shoulder portions 17 and 19 of the threshold plates which are inclined to the inner edges 13 of the vestibule floor plates 12 so as to provide clearance, as shown in Fig. 4, to permit of the car bodies 1 and 2 taking a position at an angle to each other upon curves. As shown in Figs. 11 and 12, the vestibule floor plate 12A may be circular and the shoulders 17A of the threshold plates 18A and 20A correspondingly curved to fit the vestibule floor plate. Otherwise the construction shown in Figs. 11 and 12 is identical with the construction shown in Figs. 2 and 4.

To permit of the insertion and removal of the king pin 8 which secures the center bearings to the truck 3, the vestibule floor plate 12 is provided with an opening at the center, closed by a plate 26 secured to the vestibule floor plate by screws 27, as shown in Fig. 2. Extending between the ends of the adjacent car bodies are grab handles 30, each comprising a sleeve 31 and a rod 32 telescoping therein, provided at their outer ends with ball ends 33 which fit in cup-like sockets 34 formed on brackets 35 secured to the false posts 18 and 20, respectively, so that the handles are connected to the posts by means of ball and socket joints which, together with the telescoping action provided in the handle, permits of the handle accommodating itself to all relative movements of the ends of the car bodies. A plurality of the handles 31 are provided, placed one above the other as shown in Fig. 1, on both sides of the passageway so as not only to provide a convenient means for passengers to grasp, but to provide a means for preventing passengers from being thrown against the vestibule diaphragm 36 which extends between the car ends.

The vestibule diaphragm 36 is composed of a plurality of vestibule sections, each section comprising a plurality of strips 37 which are secured together at their edges as shown and extend in arch shape from one side of the vestibule floor plate to the other. The strips adjacent the car ends are secured to angles 38 carried by the posts 18 and 20 and to Z members 44 secured to the car body end plates 46 by angles 40 held to the angle 38 and members 44 by pins 42 which extend through openings in the strips and angles and Z-member and are secured therein in any desired manner as by keys 43.

As shown in Figs. 2, 4 and 5, the sections secured to the adjacent car ends are secured together by means of a flanged channel 47 of arch shape which rests upon the floor plate 12 and which extends with the diaphragm from one side of the vestibule floor plate to the other, and in which, as shown in Fig. 5, the adjacent end strips 37 of the diaphragm sections are inserted. A sectional filler strip 48 of wood or other suitable material is inserted between the strips 37 and the strips 37 and 48 secured together in the channel 47 by suitable securing means; a rivet 50 being shown in Fig. 5, although it is to be understood that a bolt or other securing means may be used. The filler strip 48 is made in sections, some sections being straight while other sections are curved to conform to the curvature of the channel 47 and strips 37.

As shown in Figs. 6, 7, 8, 9 and 10, the means for securing the end strips 37 to the channel 47 may be modified. As shown in Fig. 6, the end strips 37A are of greater width than in Fig. 5 and are folded about a cylindrical filler 51 providing enlarged edges 49 which are received in the recesses 52 formed in the flanges 53 of the channel 47A. A sectional filler 48A is inserted between the ends 37A holding the edges 49 in the recesses 52 and the ends 37A and filler 48A are secured in the channel by means of bolts 54 and nuts 55. As shown in Fig. 7, the channel member 47B is provided with a recess 52B in one flange only and the sectional filler strip 48B is inserted between the straight flange 53B and the folded back end of the strip 37B. The strips 37B and filler 48B are secured in the channel by the bolts 54 and nuts 55. As shown in Fig. 8, one end strip 37C is riveted to one flange 53C of the channel 47C, while the other end strip 37C is riveted to one leg of U-shape sections 56 of spring metal engaged on the edge of the strip. The strip 37C and spring sections 56 are then inserted in the channel 47C and the ends 37C secured therein as by pins 57 held in position by keys 58. In this construction the spring sections 56 are relied upon to hold the strips 37C in engagement with the channel 47C to prevent moisture or draughts from entering through openings between the strips 37C and the channel 47C. In Fig. 9 one of the strips 37D is secured to a flange 53D of the channel 47D while to the other strip 37D is secured a tapered filler strip 48D. The filler strip 48D is made in sections, as are the filler strips 48 and 48A, and the strips 37D and filler strip 48D are secured in position in the channel 47D by means of pins 57 and keys 58, as in Fig. 8. In the construction shown in Fig. 10, the channel member 47E is provided with laterally projecting flanges 60 of greater width than the laterally projecting flanges on the channels 47 of the other views; and to these channels are secured the strips 37E by means of bolts 62 and nuts 63; sectional protecting strips 64 being provided between the heads of the bolts 62 and the strips 37E.

The construction above described provides a vestibule connection between the car bodies of an articulated car which provides a safe and convenient protecting passageway between the adjacent car bodies at all times; which will permit of using the articulated car construction on railways in which curves of short radii are necessary; and which permits of readily separating the vestibule sections or of readily detaching the vestibule from the car ends to permit of the separation of the car bodies when that is necessary.

What is claimed is:

1. In an articulated car, a plurality of relatively movable car bodies, vestibule diaphragm sections secured to said bodies and means connecting said diaphragm sections to form a continuous diaphragm between said car bodies.

2. In an articulated car, a plurality of relatively movable car bodies and a continuous diaphragm extending between said bodies and detachably secured thereto.

3. In an articulated car, a plurality of relatively movable car bodies and a diaphragm extending between said bodies, said diaphragm comprising sections secured together and to said bodies.

4. In an articulated car, a plurality of relatively movable car bodies, diaphragm sections secured to said bodies and a continuous channel member connecting said diaphragm sections to form a continuous diaphragm between said bodies.

5. In an articulated car, a plurality of relatively movable car bodies, diaphragm sections secured to said bodies, a continuous channel member and means detachably connecting said diaphragm sections and channel.

6. In an articulated car, a plurality of relatively movable car bodies, vestibule diaphragms secured to said bodies, means connecting said diaphragms, and a vestibule floor plate supported on said bodies.

7. In an articulated car, a plurality of relatively movable car bodies, vestibule diaphragm sections secured to said bodies, means connecting said diaphragm sections, and a vestibule floor plate extending between said bodies and supporting the diaphragm section connecting means.

8. In an articulated car, a plurality of relatively movable car bodies, a vestibule floor plate extending between and supported on said bodies, and threshold plates mounted on said bodies and overlapping said floor plates.

9. In an articulated car, a plurality of relatively movable car bodies, a vestibule floor plate extending between and supported on said bodies, threshold plates mounted on said bodies and overlapping said floor plate, and a guiding means for said floor plate carried by said bodies.

10. In an articulated car, a plurality of relatively movable car bodies, a vestibule floor plate mounted on said bodies, diaphragm sections secured to said bodies, a continuous channel member connecting said sections and bearing on said floor plate, and threshold plates mounted on said bodies and overlapping said floor plate.

11. In an articulated car, a plurality of relatively movable car bodies, a vestibule floor plate extending between said bodies, and threshold plates and posts mounted on said bodies and overlapping said floor plate.

12. In an articulated car, a plurality of relatively movable car bodies, a vestibule floor plate extending between said bodies, threshold plates and posts mounted on said bodies and overlapping said floor plate, diaphragm sections secured to said posts, and means connecting said diaphragm sections carried by said floor plate.

13. In an articulated car, a plurality of relatively movable car bodies, a vestibule floor plate extending between said bodies, threshold plates and posts mounted on said bodies and overlapping said floor plate, diaphragm sections secured to said posts, means connecting said diaphragm sections carried by said floor plate, and guide means for said floor plate mounted on said car bodies.

In witness whereof I have hereunto set my hand.

WILLIAM GRIFFIN.